July 19, 1949.  C. A. CARMACK ET AL  2,476,814
TRUCK BODY
Filed Dec. 17, 1946  2 Sheets-Sheet 1
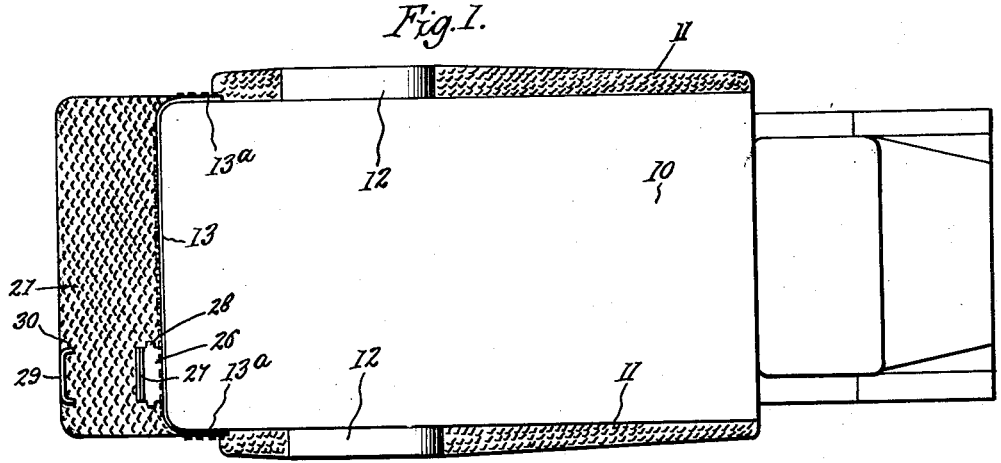
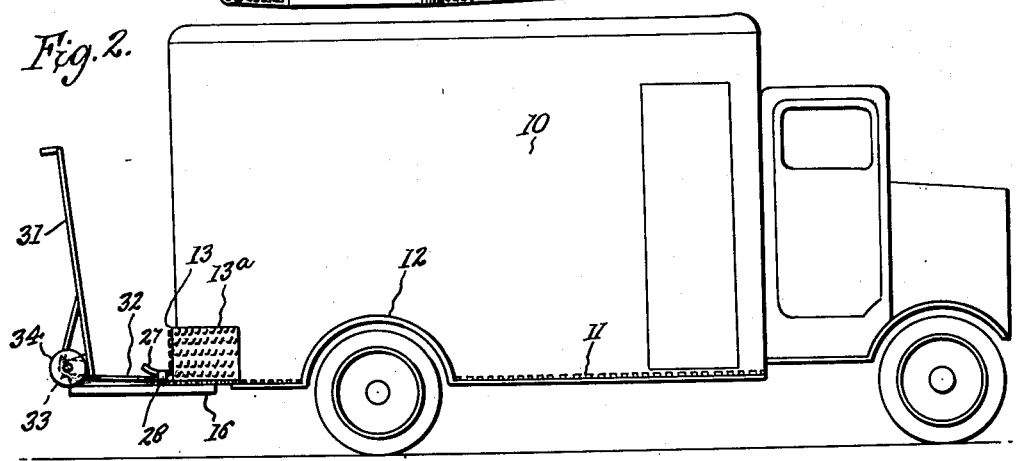
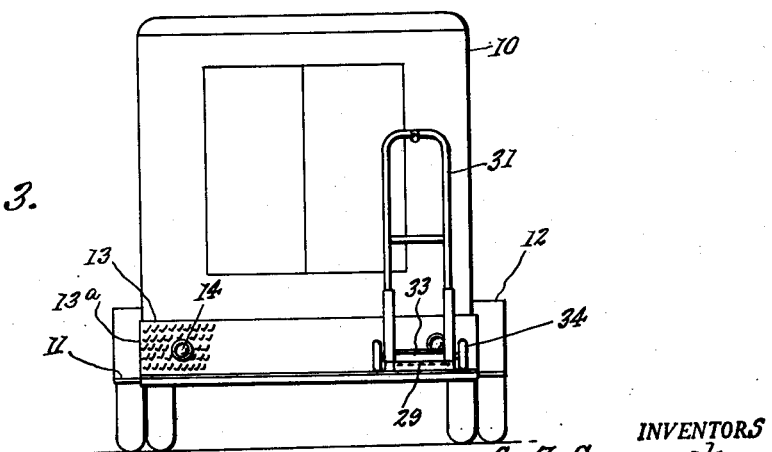
INVENTORS
C. A. Carmack
and L. L. Knighton
by Wilkinson & Mawhinney
Attorneys July 19, 1949.  C. A. CARMACK ET AL  2,476,814
TRUCK BODY
Filed Dec. 17, 1946  2 Sheets-Sheet 2
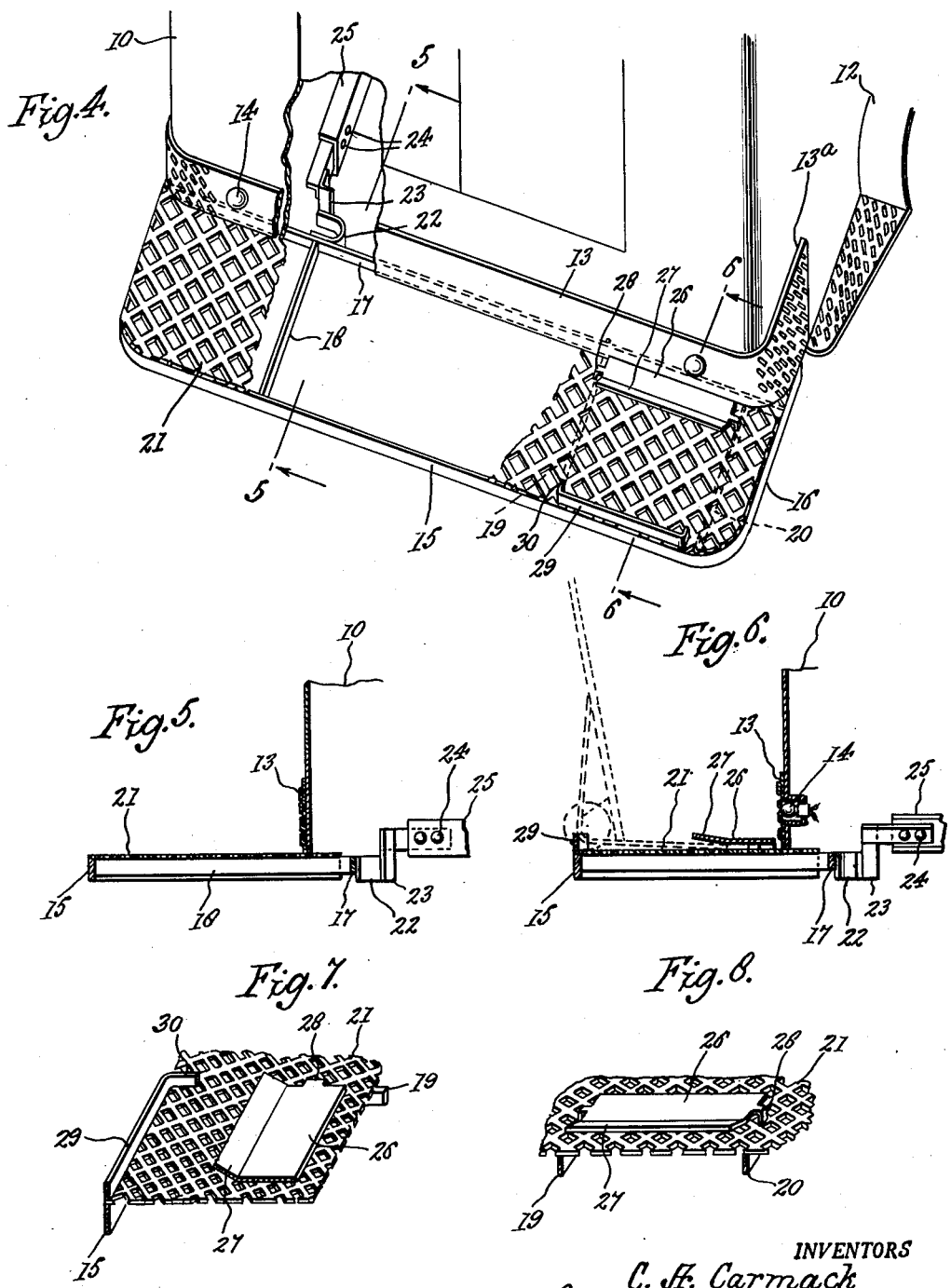
INVENTORS
C. A. Carmack
and L. L. Knighton
by Wilkinson & Mawhinney
Attorneys Patented July 19, 1949

2,476,814

UNITED STATES PATENT OFFICE 2,476,814

TRUCK BODY

Comer A. Carmack and Loyd L. Knighton,
Columbus, Ga.

Application December 17, 1946, Serial No. 716,704

5 Claims. (Cl. 280—163)

The present invention relates to improvements in truck body, and has for an object to provide an improved truck body with novel features of protection extending about the sides and rear of the same and adapted to absorb blows and shocks that would otherwise be received to the injury of the body itself.

Another object of the invention is to provide an improved step arrangement which also acts in the capacity of guards for the truck body and which provides facility in ascending and descending to and from the body in the act of loading and unloading the same.

The invention also contemplates the provision of rough surfaces and treads for the guard rails and steps for giving security of foot hold and also for conserving the painted surface to avoid rust and deterioration.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a top plan view of an improved truck body constructed in accordance with our present invention.

Figure 2 is a side elevational view of the same showing the hand truck mounted in the bracket.

Figure 3 is a rear end elevation of the truck body and hand truck as shown in Figure 2.

Figure 4 is a fragmentary perspective view showing the rear end portion of the truck and the method of mounting the step bumper.

Figure 5 is a vertical longitudinal section taken on the line 5—5 in Figure 4.

Figure 6 is a similar view taken on the line 6—6 in Figure 4.

Figure 7 is a fragmentary perspective view of the bumper step showing more particularly the bracket for the hand truck, and Figure 8 is a similar view showing one element of the bracket from a rear view point.

Referring more particularly to the drawings 10 designates generally the truck body having guard or "scrub" rails 11 in which are formed the rear guard fenders 12.

In accordance with the invention these side or guard rails 11 are given a peculiar treatment as is also a rear plate 13 and its forwardly directed flanges 13ª in which the tail lights 14 are embedded or inserted flush for purposes of protection. The flanges 13ª are adapted to clip over the side portions of the truck body 10 at the rear thereof as best seen in Figure 1.

The treatment referred to is what I denominate a "knobby" tread which means not smooth. A diamond shaped, or other, design is rolled into the metal at the time of manufacture. This type of metallic tread may be used for various purposes. It is here employed as an anti-skid surface. The "knobby" tread provides on the side or "scrub" rails 11 an anti-skid step on the side of the truck body 10. Moreover the rough or uneven surface provided by this tread tends to hold the paint in a better manner inasmuch as the raised portions of the metal take the wear of shoes and the blows of various kinds and the depressed portions retain the paint and thus are continuously rust resistant. The "knobby" treatment also strengthens and reinforces the metal locally throughout the entire areas of the guard rails and the rear plate 13. The advantage of the "knobby" tread on the rear end plate 13, 13ª over prior constructions lies both in its paint-holding and rust-resisting qualities and in the fact of its great strength and durability. A smooth metal of the same weight might approach the same strength but under weather conditions would rapidly lose its paint coat and consequently deteriorate from rust more rapidly.

The advantage of the heavy metal used as a rear end plate 13, 13ª lies in the fact that it affords protection to the truck body and to the tail lights which they have not heretofore enjoyed.

This protection is furthered by a bumper step which is carried upon a frame composed of a rear bar 15, a front bar 17, side bars 16 and cross bars 18, 19 and 20. The side bars 16 may be integral with the rear bar 15 and bent forwardly therefrom into the rounded corners of the rear portion of the bumper step. The side bars 16 may be welded or otherwise secured to the ends of the front bar 17 to form a rectangular frame. The forward ends of the side bars 16 may project forwardly of the forward bar 17 to close the gap beneath the flanges 13ª.

A tread 21 is welded or otherwise affixed upon the bumper frame. Expanded metal is shown and recommended for the purpose, inasmuch as it affords an excellent anti-skid strong tread.

The bumper step is welded or otherwise secured to the bumper springs 22 which are in turn carried by the welded angle iron assembly 23. Such assembly is affixed preferably by shear bolts 24 to the chassis 25.

The truck bracket is comprised of two members. Such members are shown more particularly in Figures 7 and 8 in which 26 designate a toe plate having a rear inclined extension 27 and 28 represent feet which are welded to the tread 21 or which pass through the tread and are welded to the cross bars 19 and 20. These feet 28 are of such height that they support the plate 26 in spaced relation above the upper surface of the tread 21 by an amount sufficient to receive the toe 32 of the two-wheeled hand truck 31.

The other member of the bracket, shown more particularly in Figures 4 and 7, consists of a back rail 29 with forwardly directed flanges 30 welded or otherwise secured to the upper surface of the tread 21 rearwardly of the toe plate 26 and for purposes of strength the back rail 29 may be superposed directly above the rear rail 15. The rear part of the truck frame 33 is received against the forward edge of the back rail 29 with parts of the truck frame 33 jamming against such back rail 29 and its flanges 30 but these flanges 30 are separated by a distance less than the pneumatic tired wheels 34 of the hand truck. The arrangement is such that while the frame 33 of the hand truck frictionally fits within the back rail 29 the treads of the tires 34 strike the bumper tread 21 before the truck frame is moved all the way down to a position where it engages the bumper tread 21. In other words the weight of the truck at the rear which is the major weight of the truck is supported upon the pneumatic tires 34 and thus any rattles are absorbed and a supporting metal to metal contact avoided.

In the use of the device should be bumper step 21 receive a blow so severe as to shear the same from the frame of the truck the rear end plate 13 will receive the blow and afford further protection to the truck body and the tail lights. Such tail lights being recessed into the end plate 13 are not apt to be damaged. Furthermore, in prior constructions, sand and mud flung from the truck rear tires soon cuts through the thin metal sheets provided as mud guards and cuts through the metal rear end of the truck itself, thus causing an unsightly appearance and a weakening of the truck structure. The heavy metal rear end plate 13 both strengthens the truck structure and improves its appearance by concealing the damage caused by the flying sand and mud. Furthermore the side flanges 13a assist materially in this function and they also protect the corner portions of the truck body while reinforcing the rear length 13 of this plate.

It will be noted that the guard rails which also furnish an anti-skid step run the entire length of the truck. The "knobby" tread is used for antiskid purposes, the heavy metal is used for protection.

The expanded metal bumper step 21 furnishes an open mesh construction to facilitate the shedding of rain, grease, etc. It also provides an antiskid surface when the bumper is being used as a step. Of great importance is the fact that this construction provides a bumper step of great strength but of light weight. The diamond shaped mesh of this metal has a truss effect and thus gives the metal more strength per pound than is possessed by solid metal. It is this great strength which has impelled the use of the shear bolts by which the bumper step is connected to the truck frame. In addition, the edge only of the mesh takes the knocks and wear and the balance of the mesh retains its paint and thus remains rust resistant.

The great strength of the bumper-step makes it preferable to connect the step to the truck frame by shear bolts, as an extremely hard angular blow on the bumper step would be inclined to knock the truck frame out of line and the shear bolts would part after a portion of the shock had been absorbed. If the bumper-step is knocked off, then the rear end plate will act as an additional protection to the truck body and will next take the force of the impact. The combination of the expanded metal bumper step plus the "knobby" tread rear end plate afford to the truck body greater protection from blows than have heretofore been given in prior constructions.

It is obvious that various changes and modifications may be made in the details of construction and design of the above specifically described embodiment of this invention without departing from the spirit thereof, such changes and modifications being restricted only by the scope of the following claims:

What is claimed is:

1. For use with a vehicle truck body, a side guard comprising side guard or scrub rails having a "knobby" tread, a rear end plate adapted to clip over the lower rear end portion of the truck body and having a "knobby" tread, a bumper-step of an expanded metal tread affixed to the lower rear end of said truck body, and spring means between said bumper-step and vehicle body for partially absorbing the shock of a forwardly directed blow at the rear or side of said bumper-step.

2. A device of the character described as claimed in claim 1 characterized by the fact that said rear end plate has forwardly bent flanges adapted to partially clip over the side of the truck body and that openings are provided through the rear end plate proximate the flanges for receiving therein tail lights and protecting the same from possible destruction as a result of a blow on the rear end plate.

3. A device of the character described as claimed in claim 2 wherein said bumper-step comprises a rear end bar having support legs bent forwardly thereof and a cross bar joins said legs proximate their free ends and an expanded metal tread is welded or otherwise secured to the top of said rear end bar, its legs and cross bar.

4. A device of the character described as claimed in claim 3 characterized by the fact that said spring means are U-shaped members having their closed ends disposed inwardly and wherein one leg of each U-shaped member is secured to the cross bar of the bumper-step and the other leg is secured to the vehicle chassis by shear bolts.

5. A bumper-step for truck bodies comprising a frame composed of front and rear spaced bars, side and cross bars secured to said front and rear bars, an open-work tread welded to said bars, and a bumper spring assembly to which the metal front bar is welded opposed to certain of the cross bars and shear bolts connecting the assembly to the chassis of the truck.

COMER A. CARMACK.
LOYD L. KNIGHTON.

REFERENCES CITED

The following references are of record in the file of this patent:

UNITED STATES PATENTS

| Number | Name | Date |
|---|---|---|
| D. 116,841 | Fitch | Sept. 26, 1939 |
| 1,453,402 | Meyer | May 1, 1923 |
| 1,542,342 | Doctor | June 16, 1925 |
| 1,547,095 | Crawley | July 21, 1925 |
| 1,593,441 | Cosgrove | July 20, 1926 |
| 1,678,657 | Thomas | July 31, 1928 |
| 1,729,956 | McVeigh | Oct. 1, 1929 |
| 1,967,503 | Darley | July 24, 1934 |
| 2,130,066 | Burgh | Sept. 13, 1938 |
| 2,265,525 | Gau | Dec. 9, 1941 |